May 28, 1929.   E. BROBECK   1,714,942
GATE
Filed May 8, 1928
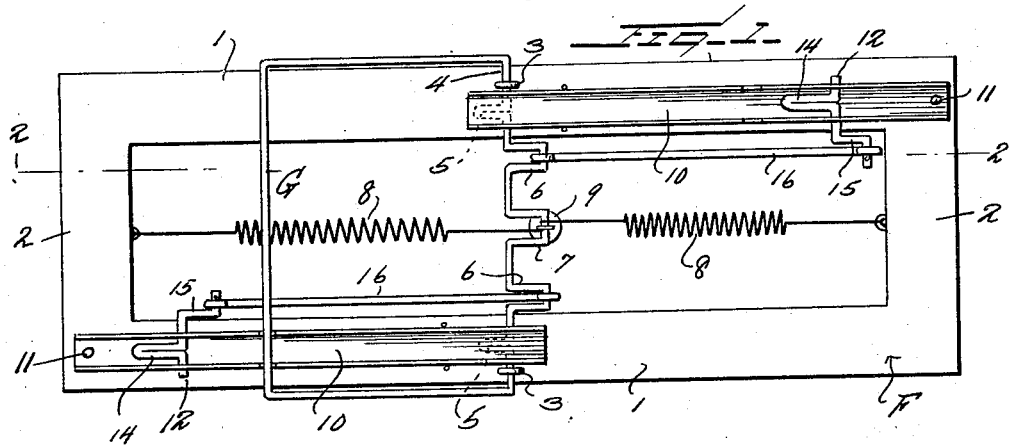
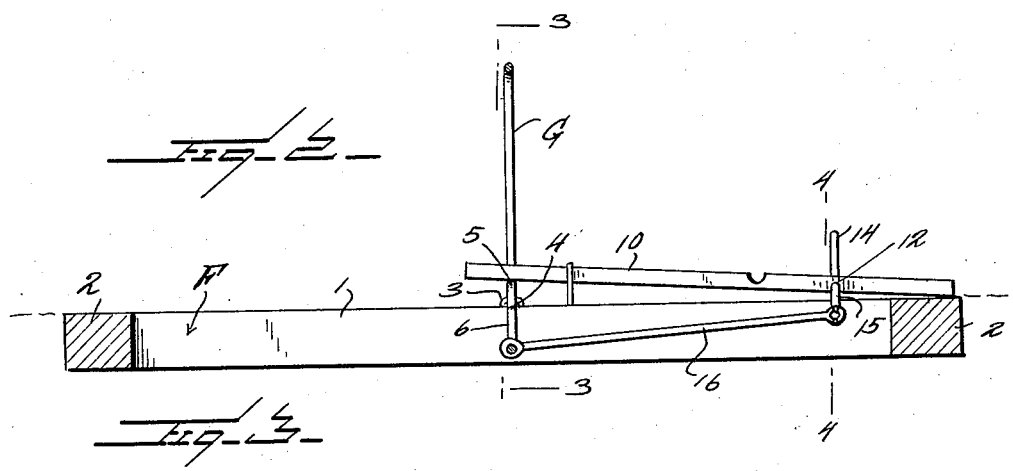
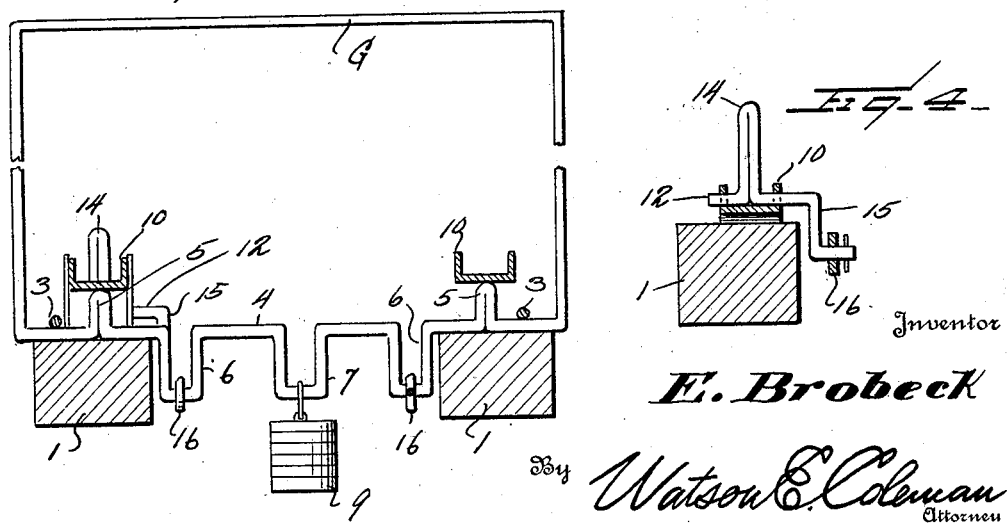
Inventor
E. Brobeck
By Watson E. Coleman
Attorney Patented May 28, 1929.

1,714,942

UNITED STATES PATENT OFFICE.

EDWIN BROBECK, OF STEAMBOAT SPRINGS, COLORADO, ASSIGNOR OF ONE-THIRD TO LAWRENCE W. WREN, OF STEAMBOAT SPRINGS, COLORADO.

GATE.

Application filed May 8, 1928. Serial No. 276,106.

This invention relates to gates, and it is an object of the invention to provide a device of this kind including a mechanism whereby the same may be readily adjusted in open position under the influence of a vehicle, thereby avoiding the necessity of the driver or other occupant of the vehicle leaving the same to effect the desired opening of the gate.

Another object of the invention is to provide a device of this kind comprising a gate supported for swinging movement in a vertical direction, together with means for normally maintaining the same in a vertical position, and wherein means are provided for automatically lowering the gate when it is desired to pass therebeyond.

The invention consists in the details of construction and in the combination and arrangement of the several parts of my improved gate whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in top plan of a gate constructed in accordance with an embodiment of my invention, the gate structure being shown in lowered position;

Figure 2 is a sectional view taken substantially on the line 2—2 of Figure 1, certain of the parts being shown in a second position with the gate raised;

Figure 3 is a sectional view taken substantially on the line 3—3 of Figure 2, the spring members illustrated in Figure 1 being omitted;

Figure 4 is a detailed sectional view taken substantially on the line 4—4 of Figure 2.

As disclosed in the accompanying drawings, F denotes a frame structure of requisite dimensions adapted to be suitably arranged upon a roadway, the said frame including the elongated side members 1 having their opposite extremities connected by the end members 2. At substantially the longitudinal center thereof, the side members 1 of the frame F have engaged therewith by the bearings 3 the lower cross member 4 of a gate structure G. This lower member 4 at points above the side members 1 of the frame F is provided with the upstanding rock arms 5 arranged in parallelism.

The portion of said member 4 between the side members 1 of the frame F and closely adjacent thereto is provided with a depending crank 6, and at a point substantially midway of said crank 6 the member 4 is provided with another depending crank 7. The cranks 6 and 7 are disposed in the same general direction and in parallelism. Secured to the crank 7 and the opposite end members 2 of the frame F are the retractile spring members 8 of a tension to normally maintain the gate structure G in substantially a vertical position and to return the gate to such position after the same has been lowered or swung downwardly in either direction.

To further facilitate the maintenance of the gate structure G in a substantially vertical position, the crank 7 has operatively engaged therewith and depending therefrom a weighted member 9. Each of the side members 1 at one end portion thereof has disposed lengthwise thereof a channel track 10 suitably anchored, as at 11, at its outer end to the adjacent end portion of the frame F and of a length to have its inner end portion resting from above upon an upstanding rock arm 5. The trackway 10 at one side of the frame is reversely disposed with respect to the trackway at the opposite side of the frame.

Each of the trackways 10 in relatively close proximity to its outer or entrance end rotatively supports a shaft 12 having an upstanding rock arm 14 disposed in the same general direction in parallelism with the rock arm 5 at the same side of the frame. The inner end portion of this shaft 12 is provided with a depending rock arm 15 disposed in the same general direction as the cranks 6 in parallelism therewith, said rock arm 14 being operatively connected with the crank 6 at the same side of the frame F by a rigid member or bar 16.

As a vehicle approaches the normally raised gate G, a wheel on one side of the vehicle is caused to travel within the trackway 10 and, when the same contacts with the upstanding rock arm 14, throws the same downwardly in a direction toward the gate G. This will result in requisite pull being imposed upon the crank 6 at the same side of the frame F to throw the gate structure G downwardly in a direction away from the approaching vehicle.

As the vehicle is passing over the lower gate structure G, a wheel on the opposite side of the vehicle will travel along the second trackway 10 and thus maintain the gate structure G in desired lowered position until the vehicle has passed entirely thereover, whereupon the spring 8, placed under tension as the gate structure G is lowered, together with the weight 9, will operate to return the gate structure G to its normal position.

From the foregoing description it is thought to be obvious that a gate constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An automatic gate comprising, in combination, a gate structure including a lower cross member, means coacting with said lower cross member for supporting the gate structure for swinging movement in a vertical direction, means for normally maintaining the gate structure in said vertical position, upstanding rock arms carried by said lower cross member adjacent the opposite ends thereof, trackways arranged at opposite sides of the gate and having therein end portions resting upon the upstanding rock arms, rock arms carried by the outer portions of the tracks and disposed in the same general direction and substantially parallel with the rock arms of the lower cross member of the gate structure, and an operative connection between the rock arm carried by each of the tracks and with the lower cross member of the gate structure for swinging the gate structure downwardly upon downward movement of the rock arm carried by the track.

2. An automatic gate comprising, in combination, a gate structure including a lower cross member, means coacting with said lower cross member for supporting the gate structure for swinging movement in a vertical direction, means for normally maintaining the gate structure in said vertical position, upstanding rock arms carried by said lower cross member adjacent the opposite ends thereof, trackways arranged at opposite sides of the gate and having therein end portions resting upon the upstanding rock arms, rock arms carried by the outer portions of the tracks and disposed in the same general direction and substantially parallel with the rock arms of the lower cross member of the gate structure, a depending rock arm associated with the rock arm of each track, depending cranks carried by the lower cross member of the gate structure, and a rigid member connecting each of the depending rock arms with a depending crank of the cross member.

3. An automatic gate comprising, in combination, a gate structure including a lower cross member, means coacting with said lower cross member for supporting the gate structure for swinging movement in a vertical direction, means for normally maintaining the gate structure in said vertical position, upstanding rock arms carried by said lower cross member adjacent the opposite ends thereof, trackways arranged at opposite sides of the gate and having their inner end portions resting upon the upstanding rock arms, rock arms carried by the outer portions of the tracks and disposed in the same general direction and substantially parallel with the rock arms of the lower cross member of the gate structure, and an operative connection between the rock arm carried by each of the tracks and with the lower cross member of the gate structure for swinging the gate structure downwardly upon a downward movement of the rock arm carried by the track, the means for normally maintaining the gate structure in a vertical position comprising retractile springs operatively engaged with said cross member and disposed at opposite sides thereof.

4. An automatic gate comprising, in combination, a gate structure including a lower cross member, means coacting with said lower cross member for supporting the gate structure for swinging movement in a vertical direction, means for normally maintaining the gate structure in said vertical position, upstanding rock arms carried by said lower cross member adjacent the opposite ends thereof, trackways arranged at opposite sides of the gate and having their inner end portions resting upon the upstanding rock arms, rock arms carried by the outer portions of the tracks and disposed in the same general direction and substantially parallel with the rock arms of the lower cross member of the gate structure, and an operative connection between the rock arm carried by each of the tracks and with the lower cross member of the gate structure for swinging the gate structure downwardly upon a downward movement of the rock arm carried by the track, the means for normally maintaining the gate structure in a vertical position comprising retractile springs operatively engaged with said cross member and disposed at opposite sides thereof, said cross member being provided with a depending member with which said springs are engaged.

In testimony whereof I hereunto affix my signature.

EDWIN BROBECK.